US005957022A

United States Patent [19]

Stumpf et al.

[11] Patent Number: 5,957,022

[45] Date of Patent: Sep. 28, 1999

[54] ADJUSTABLE FENCE FOR A COMPOUND MITER SAW

[75] Inventors: William R. Stumpf, Kingsville; Daryl S. Meredith, Hampstead; John W. Miller, Upperco; Michael L. O'Banion, Westminster, all of Md.

[73] Assignee: Black & Decker Inc., Newark, Del.

[21] Appl. No.: 08/923,573

[22] Filed: Sep. 4, 1997

Related U.S. Application Data

[63] Continuation of application No. 08/499,339, Jul. 7, 1995, Pat. No. 5,755,148.

[51] Int. Cl.$^{6}$ .............................. B26D 7/02; B23D 19/08

[52] U.S. Cl. ........................ 83/468.2; 83/468.6; 83/471.3; 83/581

[58] Field of Search ................................ 83/468.2, 468.3, 83/471.3, 473, 490, 522.18, 581, 468.5, 468.6; 269/303, 315, 319

[56] References Cited

U.S. PATENT DOCUMENTS

| | | | |
|---|---|---|---|
| 565,652 | 8/1896 | Walter et al. | 269/303 |
| 641,027 | 1/1900 | Martin | 83/468.6 |
| 769,307 | 9/1904 | Dorn | 269/303 |
| 1,006,521 | 10/1911 | Ayer | 83/468.6 |
| 1,033,527 | 7/1912 | Bradshaw | 83/468.6 |
| 1,566,225 | 12/1925 | Mills | 269/315 |
| 2,589,033 | 3/1952 | Baumgartner | 83/468.5 |
| 2,964,004 | 12/1960 | Carper | 83/468.5 |
| 3,310,973 | 3/1967 | Leis | 83/468.5 |
| 4,109,901 | 8/1978 | Akin . | |
| 4,245,533 | 1/1981 | Batson . | |
| 4,265,154 | 5/1981 | Batson . | |
| 4,452,117 | 6/1984 | Brickner et al. . | |
| 4,603,612 | 8/1986 | Atkins | 269/315 |
| 4,638,700 | 1/1987 | Fushiya et al. . | |
| 4,694,720 | 9/1987 | Brickner, Jr. et al. . | |
| 4,798,113 | 1/1989 | Viazanko . | |
| 4,869,142 | 9/1989 | Sato et al. . | |
| 4,875,399 | 10/1989 | Scott et al. | 269/303 |
| 4,934,233 | 6/1990 | Brundage et al. . | |
| 5,042,348 | 8/1991 | Brundage et al. . | |
| 5,060,548 | 10/1991 | Sato et al. . | |
| 5,063,805 | 11/1991 | Brundage . | |
| 5,146,826 | 9/1992 | Shiotani et al. . | |
| 5,181,448 | 1/1993 | Terpstra . | |
| 5,197,365 | 3/1993 | Clifton . | |
| 5,235,889 | 8/1993 | Brickner et al. . | |
| 5,285,708 | 2/1994 | Bosten et al. . | |
| 5,293,801 | 3/1994 | Dritenbas . | |
| 5,297,463 | 3/1994 | O'Banion et al. . | |
| 5,483,858 | 1/1996 | Chen . | |
| 5,564,323 | 10/1996 | Sasaki et al. . | |

FOREIGN PATENT DOCUMENTS

| | | |
|---|---|---|
| 009 1558 | 10/1983 | European Pat. Off. . |
| 189397 | 7/1905 | Germany . |
| 1002519 | 7/1957 | Germany . |

*Primary Examiner*—Rinaldi I. Rada
*Assistant Examiner*—Sean Pryor
*Attorney, Agent, or Firm*—Harness, Dickey & Pierce, P.L.C.

[57] ABSTRACT

A workpiece-supporting fence has a pair of movable fences movably attached to a fixed fence which is secured to a base of the device in which the fence is being used. The pair of movable fences are located on opposite sides of a working tool such as a saw blade. A fixed clamping arrangement is associated with each movable fence and provides a single point actuation member for each movable fence to clamp the movable fence to the fixed fence such that the movable fence is vertically aligned and flush with the fixed fence. In one embodiment, each movable fence is provided with a gap-filling flap which is pivotably secured to the movable fence to be movable between a lower and an upper position. In its lower position, the gap-filling flap minimizes the gap between the movable fence and the working tool. In its upper position, the gap-filling flap provides additional support when working with taller or thicker workpieces. The workpiece-supporting fence further includes a fence position indicator which allows for the positioning of one or both of the movable fences for providing clearances for a specific miter and/or bevel cut. In addition, the workpiece-supporting fence incorporates a detent system for locating the fence at tone or more of the most popular miter and/or beveling settings.

38 Claims, 8 Drawing Sheets

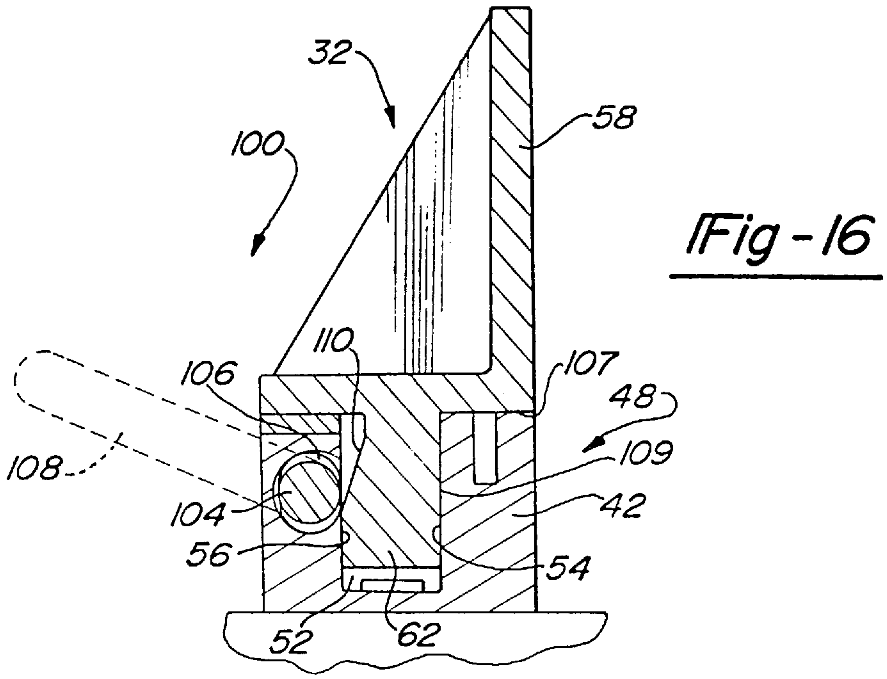
Fig-16
Fig-21B
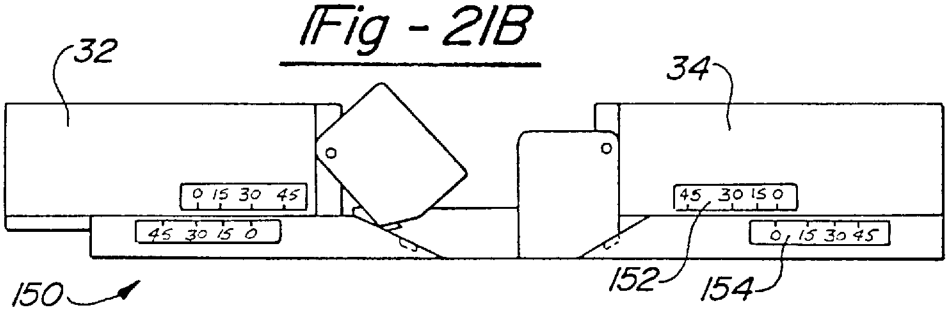
Fig-21C
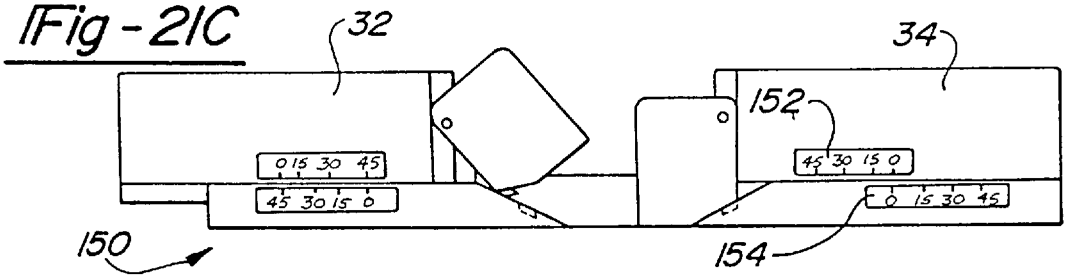
Fig-21D
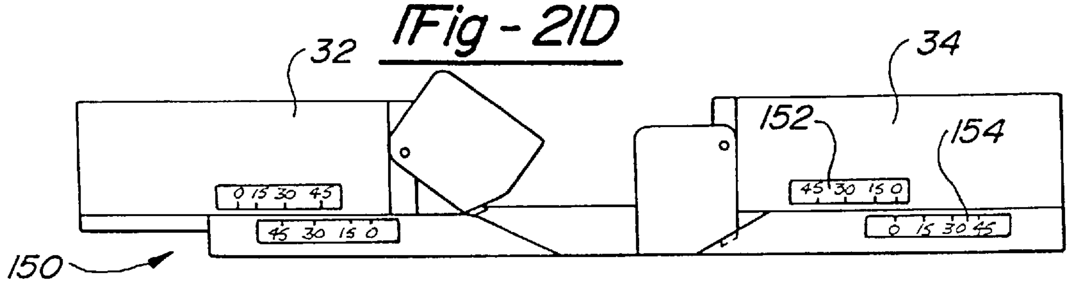

ADJUSTABLE FENCE FOR A COMPOUND MITER SAW

This is a continuation of U.S. patent application Ser. No. 08/499,339, filed Jul. 7, 1995, now U.S. Pat. No. 5,755,148.

FIELD OF THE INVENTION

The present invention relates to compound miter saws or other power operated equipment or machinery utilizing a cutter for performing working operations on a workpiece. More particularly, the present invention relates to improvements in an adjustable fence assembly for such power operated equipment, with the fence assembly having a fixed fence and a pair of movable fences for selectively adjusting the gap between the cutter and the movable fences in order to allow sufficient clearance for performing various operations on a workpiece when the equipment is in any of a number of different cutting or working modes.

BACKGROUND OF THE INVENTION

Saws and other apparatuses designed for cutting or performing other working operations on a workpiece typically require a workpiece-supporting fence in order to support and locate the workpiece in a proper fixed position for performing the working operation. Examples of such equipment include cross-cut compound miter saws which are adapted for allowing the user to selectively move the saw blade into any of a number of positions or modes for square cutting, miter cutting, bevel cutting, or compound miter cutting where a combination miter and bevel are cut. In addition, some operations, such as dado cutting or shaping operations, for example, require the use of saw blades or other cutting or working devices of different shapes or sizes to be substituted for one another in order to perform the desired operation on the workpiece, whether the workpiece is composed of wood, plastic, metal other materials.

In order to accommodate these widely varied working operations, the workpiece-supporting fence is frequently required to be at least partially adjustable in order to selectively vary the gap or space between the saw blade or cutter and the workpiece-supporting fence, thus selectively providing clearance for the saw blade, cutter, or other device performing the working operation on the workpiece. If such adjustability were not available, a relatively large permanent gap would have to be provided between the fixed fence and the saw blade or cutter in order to accommodate the widely varying range of movement, position, or size of the saw blade, cutter, or other working device.

In order to address the above-discussed problems associated with providing clearance for the cutter and support for the workpiece with the incorporation of a movable fence having an adjustable clearance gap, a variety of fence-adjusting arrangements have previously been provided. However, many of such prior fence-adjusting arrangements have suffered various disadvantages, including difficulty in maintaining proper alignment between the stationary fence and the movable fence in wide-gap positions, inconvenience in performing fence adjustment operations, the possibility of inadvertently misplacing a removable fence, lack of adequate support for relatively tall or thick workpieces, or other similar disadvantages. Thus, the need has arisen for an adjustable fence assembly for compound miter saws, or other power equipment requiring fence adjustability, which overcomes these disadvantages, as well as providing improved ease of operation, economy in manufacturing, and other advantages that will become readily apparent to those skilled in the art from the discussion below.

SUMMARY OF THE INVENTION

In accordance with the present invention, an improved adjustable workpiece-supporting fence assembly includes a pair of movable fences laterally movably interconnected with a fixed fence which is secured to a base of the device in which it is employed. The pair of movable fences are disposed on opposite sides of a saw blade, a workpiece cutter or other such device for performing a working operation on a workpiece. Each movable fence is independently movable, and is selectively and laterally movably interconnected with the fixed fence on opposite sides of the work-performing blade or cutter. Each is also laterally spaced from the other movable fence located on the opposite side of the blade or cutter. The base or other portion of the device in one preferred form of the invention supports the fixed fence having a fence guide fixedly disposed on opposite sides of the blade or cutter with a laterally-extending slot formed in each of the fence guides. The laterally-extending slots which preferably have spaced opposite internal walls therein are adapted to receive a laterally extending tongue portion on a respective one of the pair of movable fences. The tongue is slidably received within the respective slot for selective adjustable lateral movement of the movable fences toward and away from the blade or cutter.

In the above described preferred embodiment of the present invention, a single fixed clamping arrangement is interconnected with the fixed fence on each side of the saw blade or cutter. Each single fixed clamping arrangement releasably and clampingly urges the tongue on the respective movable fence against the front wall of the laterally-extending slot at any of a number of adjusted positions therein.

In one preferred embodiment of the present invention, the single fixed clamping arrangement includes a threaded clamping member disposed on each outside end (end farthest away from the cutter) of the fixed fence and a locating pad machined into the slot of each fence guide. The locating pads are formed on each side of the saw blade or cutter at the inside end (end closest to the saw blade or cutter) of the fence guide. A corresponding locating surface is formed on the tongue of each movable fence such that the locating surface on the movable fence engages the locating pad on the fence guide when the movable fence is located at its innermost position. The locating pad and locating surface are machined to tight tolerances, thus allowing the utilization of a single threaded clamping member disposed at the outside end of the fixed fence. When the movable fence is moved towards its outermost position, the locating pad disengages from the locating surface at approximately the same time the center of the movable fence is positioned in line with the threaded clamping member thus allowing the utilization of a single threaded clamping member disposed at the outside end of the fence guide.

In an additional preferred embodiment of the present invention, the single fixed clamping arrangement includes a longitudinally extending clamping rod positioned generally parallel to each slot. The clamping rod incorporates a continuous locking lobe or a plurality of locking lobes such that rotation of the clamping rod causes the locking lobe or lobes to clamp the movable fence against the front wall of the slot in the respective fence guide.

In addition, the preferred embodiments of the present invention also include a gap-filling flap pivotably mounted to the inside end of each movable fence. Each gap-filing flap in its lower position is designed to provide additional support for the workpiece at a position immediately adjacent to the saw blade or cutter.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 16 is a partial cross-sectional view similar to FIG. 8A but illustrating the single locking mechanism shown in FIG. 13;

FIG. 21B is a view similar to FIG. 21A but showing the fence assembly of the present invention adjusted for a 30° bevel cut;

FIG. 21C is a view similar to FIG. 21A but showing the fence assembly of the present invention adjusted for a 45° miter cut; and FIG. 21D is a view similar to FIG. 21A but showing the fence assembly of the present invention adjusted for a compound miter cut of a 30° bevel cut and a 45° miter cut.

DETAILED DESCRIPTION OF THE PREFERRED EMBODIMENTS

Figure 1:
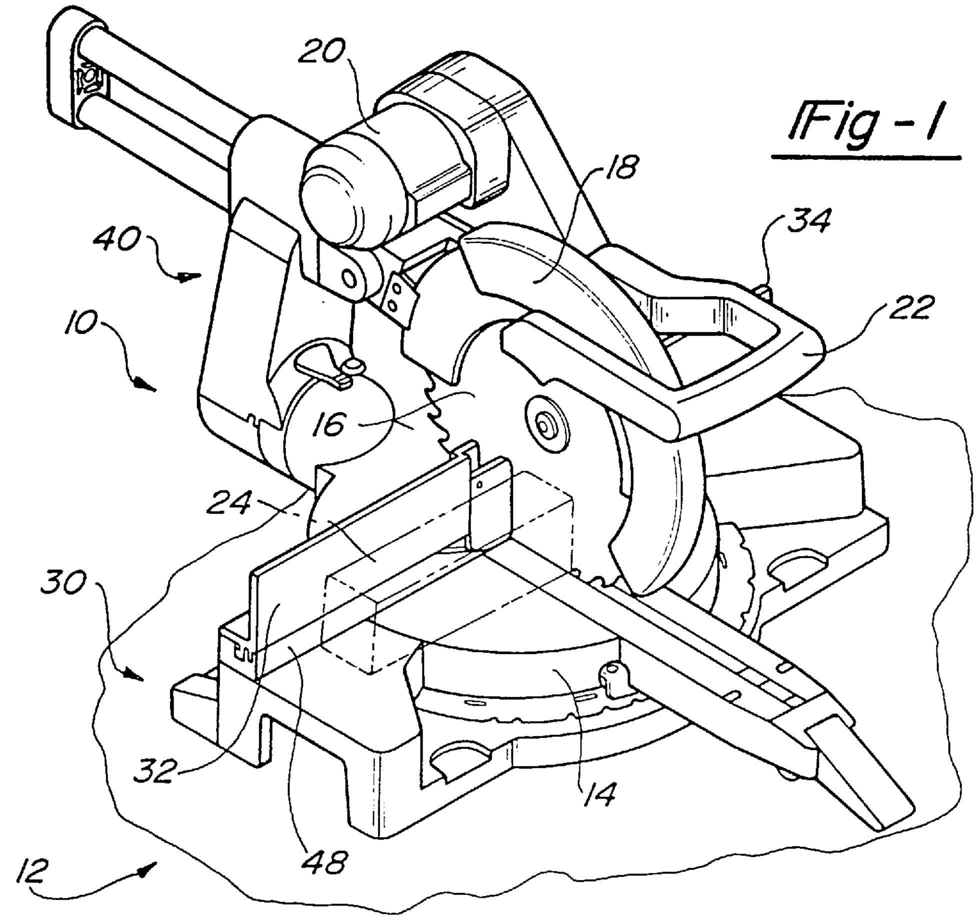
FIG. 1 is a front perspective view of a sliding compound miter saw in accordance with the present invention.
Figure 2:
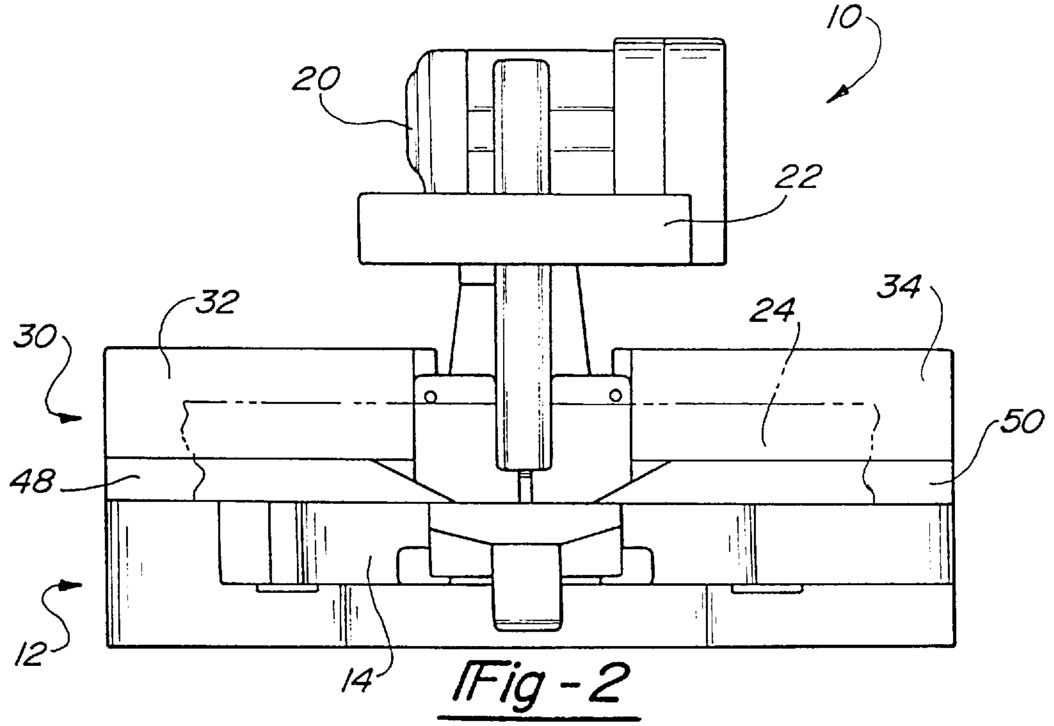
FIG. 2 is a front elevational view of the sliding compound miter saw shown in FIG. 1.

Referring now to the drawings in which like reference numerals designate like or corresponding parts throughout the several views, there is shown in FIGS. 1 through 12 an exemplary sliding compound miter saw incorporating an adjustable fence assembly according to the present invention, shown merely for the purposes of illustration, and designated generally by the reference numeral 10. One skilled in the art will readily recognize from the following description, taken in conjunction with the accompanying drawings and claims, that the principles of the present invention are equally applicable to sliding compound miter saws, compound miter saws, chop saws, radial arm saws, table saws or other saws of types other than that shown for purposes of illustration in the drawings. Similarly, one skilled in the art will readily recognize that the principles of the adjustable fence according to the present invention are also applicable to other types of powered or unpowered equipment for performing an operation on a workpiece. Such equipment includes, but is not limited to, dado saws, spindle shapers or sanders, or other types of powered or unpowered devices that would benefit from selective adjustment of the gap or spacing in the fence assembly in order to accommodate different sizes or positions of tooling, or to perform various different workpiece working operations.

Referring primarily to FIGS. 1 through 4, sliding compound miter saw 10 includes a base assembly 12, including a table assembly 14, which is preferably rotatable in order to accommodate the various cutting positions discussed below. Miter saw 10 also includes a saw blade 16, a blade guard 18, a motor 20 drivingly connected to saw blade 16, and a handle 22. Handle 22 assists the operator in moving saw blade 16 and blade guard 18 from a clear position free of a workpiece 24 to a cutting position with saw blade 16 in cutting engagement with workpiece 24.

A fence assembly, as best seen in FIGS. 1 through 5 and indicated generally by the reference numeral 30, is interconnected with base 12 and extends laterally across table assembly 14, against which workpiece 24 is positioned and supported for performing a cutting operation thereon. According to the present invention, fence assembly 30 includes a first and a second movable fence 32 and 34, respectively, extending in a mutually aligned lateral direction, with each movable fence 32 and 34 being laterally spaced from the other. Such lateral spacing or gap between the two movable fences 32 and 34, provides clearance for saw blade 16 to perform a cutting operation completely through workpiece 24, regardless of the mode or type of cutting operation being performed. As is discussed in more detail below, movable fences 32 and 34 are each movable toward and away from saw blade 16 in order to allow the operator to selectively adjust the clearance gap therebetween and thus accommodate the particular cutting operation being performed.

Figure 6:
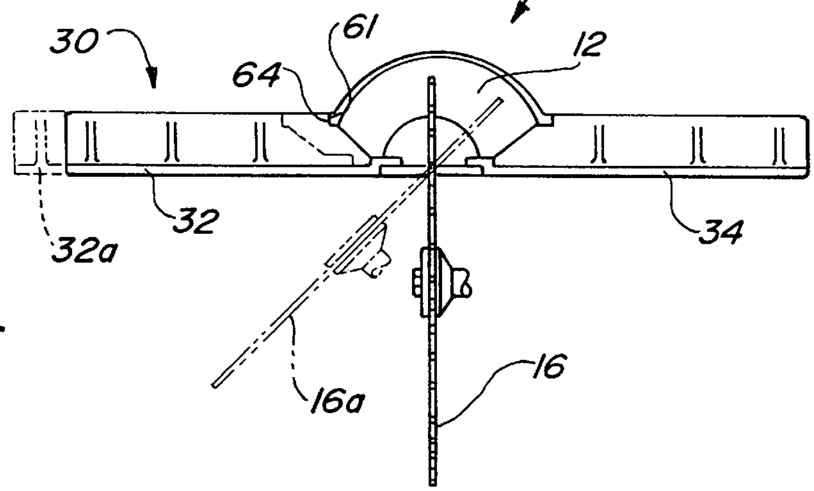
FIG. 6 is a schematic plan view diagram of the sliding compound miter saw of FIGS. 1 through 4 schematically illustrating the position of the saw blade relative to the adjustable fence in a miter cutting position and a straight cross cut position.
Figure 7:
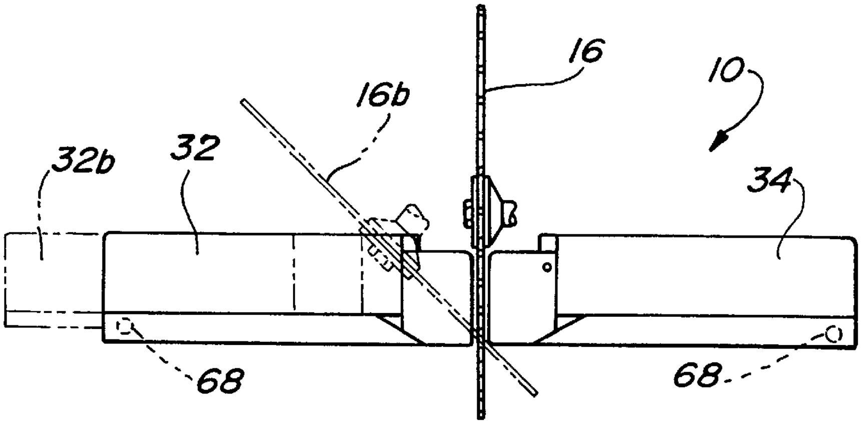
FIG. 7 is a schematic diagram, similar to that of FIG. 6, but shown in an elevational view and illustrating the adjustable fence assembly shown in a bevel cutting condition and a straight cut position.

As is schematically illustrated in FIGS. 6 and 7, the exemplary sliding compound miter saw 10 depicted in the drawings is capable of a number of different cutting modes or positions. In FIG. 6, a schematic plan view generally illustrates the position of saw blade 16 relative to base assembly 12 and fence assembly 30 when performing a straight sliding or straight miter-cutting operation. Such straight, square, sliding cutting operations are schematically illustrated by the position of saw blade 16 shown in solid lines in FIG. 6. The movable fences 32 and 34 are selectively adjusted to provide the minimum required clearance gap between saw blade 16 and the two movable fences 32 and 34, to permit saw blade 16 to be moved into the cutting position along a single, vertical plane, substantially perpendicular to both the front face of fence assembly 30 and the upper face of table assembly 14. To permit miter cutting, as schematically illustrated in phantom lines in FIG. 6, movable fence 32 is preselectively adjusted, as indicated in phantom by reference numeral 32*a*, to increase the clearance gap between saw blade 16 and movable fence 32*a*, in order to provide sufficient clearance for saw blade 16*a* and the associated components.

FIG. 7 illustrates saw blade 16 and fence assembly 30 in a schematic elevational view, showing the position of saw blade 16 and movable fences 32 and 34 as solid lines for performing the above-described straight, square, sliding operation. The relative positions of saw blade 16 and movable fence 32 are shown in phantom lines, as indicated by reference numeral 16*b* and 32*b*, respectively, for performing bevel cuts on workpiece 24. The plane of movement of saw blade 16*b* is generally perpendicular to the face of fence assembly 30, but can be selectively oriented at a bevel angle with respect to table assembly 14. Again, fence 32 can be adjusted to a predetermined position, as shown in phantom at 32*b*, to accommodate the bevel angle selected for saw blade 16*b*.

Although not specifically illustrated in the drawings, one skilled in the art will readily recognize, from the exemplary positions diagrammatically illustrated in FIGS. 6 and 7, that the miter-cutting operation can be combined with the bevel-cutting operation in order to perform compound mitering. In a compound mitered cut, saw blade 16 moves in a plane which is not perpendicular either to the front face of fence assembly 30 or to the upper face of table assembly 14. In addition, although not specifically illustrated in the drawings, one skilled in the art will readily recognize, from the exemplary positions diagrammatically illustrated in FIGS. 6 and 7, that the miter-cutting operation and the bevel-cutting operation can be performed by angling saw blade 16 in the opposite direction from what is illustrated and then selectively adjusting movable fence 34 (but to the right in FIGS. 6 and 7) in a manner similar to that shown for movable fence 32.

Thus, sliding compound miter saw 10 shown for purposes of illustration in the drawings is capable of at least four general types of cutting operations, to which reference is made herein as sliding, miter-cutting, bevel-cutting and compound miter-cutting operations. The miter-cutting, bevel-cutting and compound miter-cutting operations can be performed by angling saw blade 16 in either direction from the sliding operation due to the incorporation of movable fences 32 and 34 on opposite sides of saw blade 16. Literally, an infinite compound adjustability of the relative position and orientation of saw blade 16 relative to both table assembly 14 and fence assembly 30 can be accomplished in the present invention by way of a compound pivot and slide mounting mechanism referred to generally as reference numeral 40 in FIGS. 1, 3 and 4. Compound pivot and slide mounting mechanism 40 can be any of a number of well-known pivot and bevel mounting and support mechanisms which also allow saw blade 16 and blade guard 18 to be pivotally and slidingly moved from a rear, raised, clear position to a lowered or cutting position, once miter saw 10 is adjusted to the desired operating mode, in order to perform a cutting operation on workpiece 24 by lowering saw blade 16 into workpiece 24 and then moving saw blade 16 longitudinally through workpiece 24.

Figure 3:
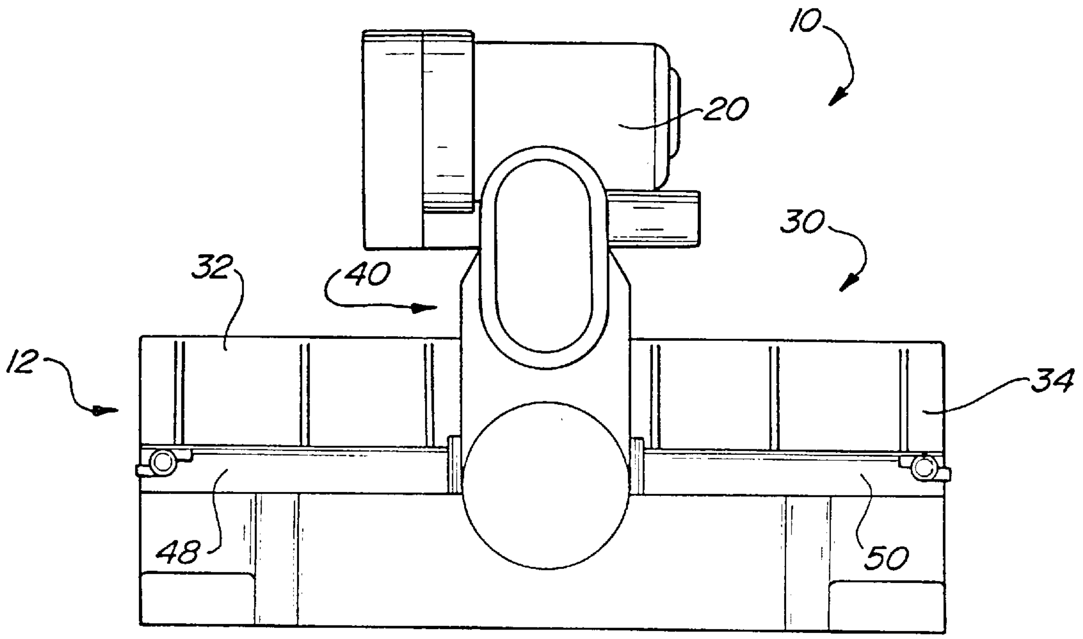
FIG. 3 is a rear elevational view of the sliding compound miter saw shown in FIGS. 1 and 2.
Figure 4:
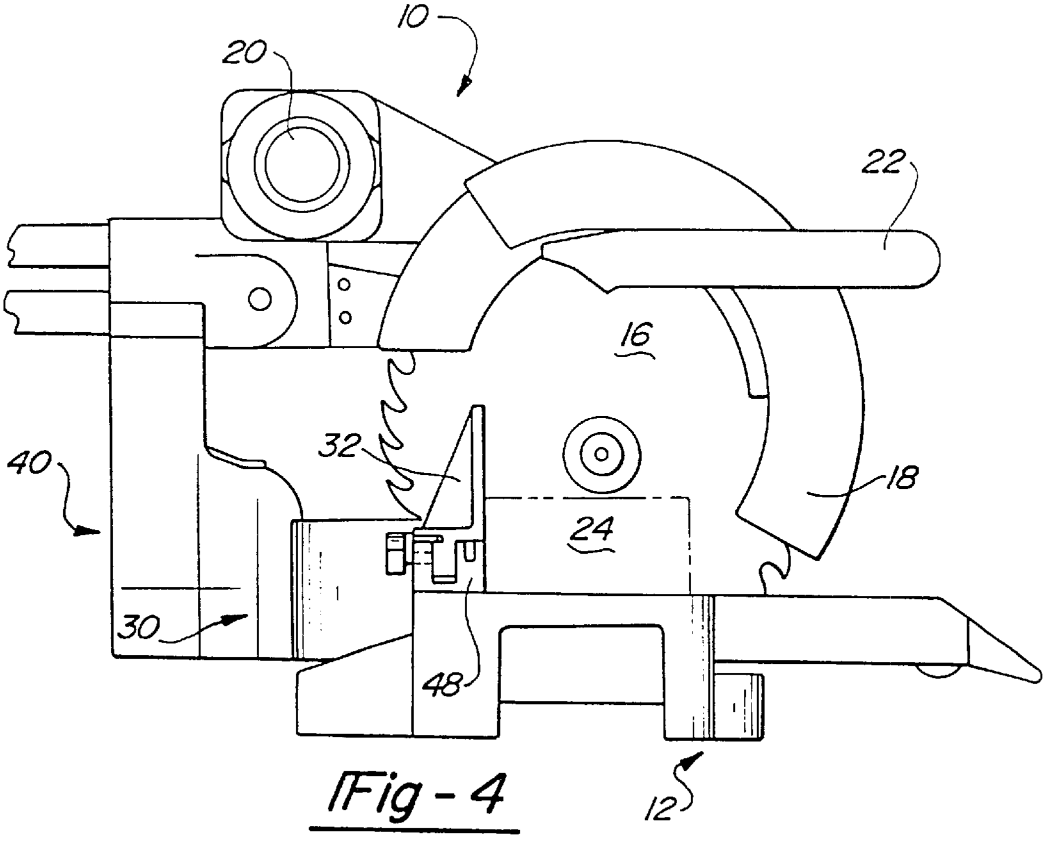
FIG. 4 is a side elevational view of the sliding compound miter saw shown in FIGS. 1 through 3.
Figure 5:
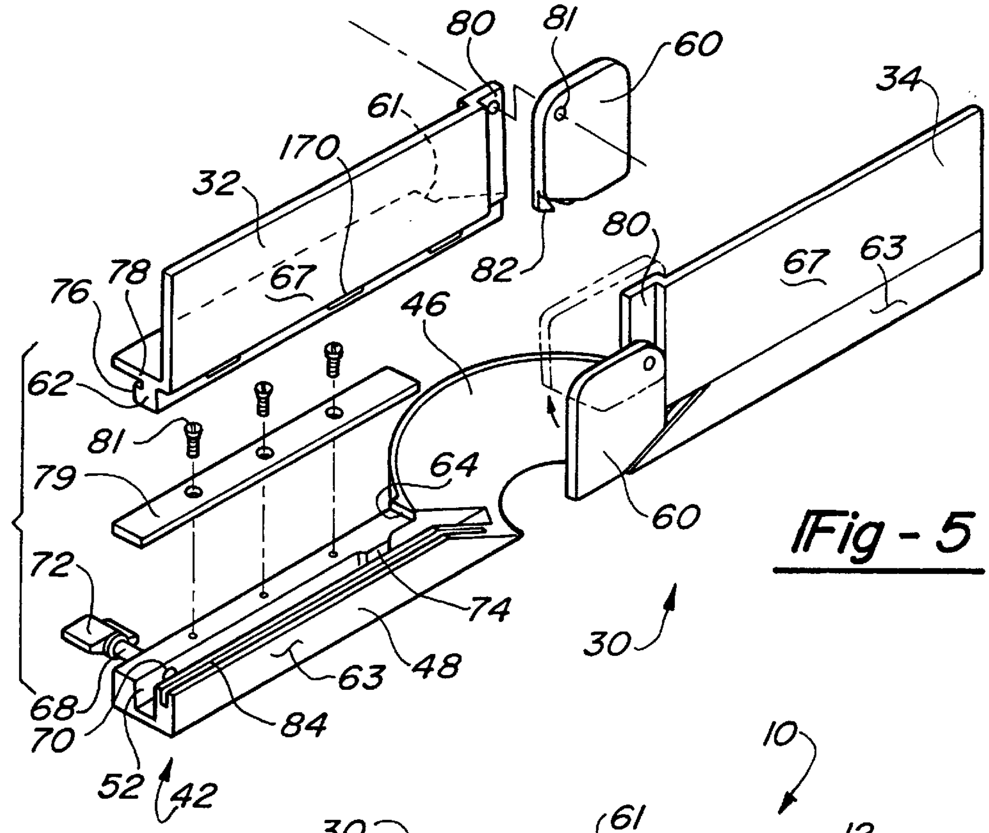
FIG. 5 is a perspective view of the adjustable fence assembly in accordance with the present invention illustrating one side of the adjustable fence assembly exploded and the other side in the assembled condition.
Figure 8A:
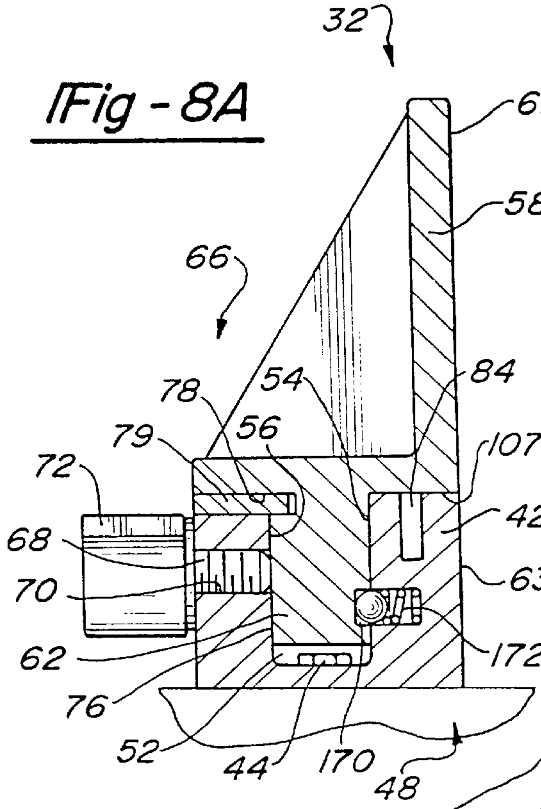
FIG. 8A is a partial cross-sectional view of the adjustable fence assembly illustrating the single locking mechanism and an anti-removal system according to the present invention.

In order to allow a complete cut-through operation to be performed on workpiece 24 by saw blade 16, fence assembly 30 must be capable of selective adjustment in order to preadjust the lateral clearance gap or spacing between saw blade 16 and the two movable fences 32 and 34, while still providing adequate vertical support for workpiece 24. In accordance with a preferred form of the present invention as best shown in FIG. 5, the adjustability of fence assembly 30 is accomplished in part by securing a fence-supporting member 42 to base assembly 12. Fence-supporting member 42, as shown in FIGS. 5 and 8A, is a separate component fixedly secured to base assembly 12 by a plurality of bolts 44, and includes an interconnecting portion 46 extending laterally across a clearance gap, behind movable fences 32 and 34 to interconnect a pair of fixed fences 48 and 50, as shown in FIGS. 1, 3 and 5, without interfering with the complete cutting of a workpiece 24. Fence-supporting member 42 is fixedly secured to, or interconnected with, base assembly 12 with its fixed fences 48 and 50 being mutually aligned in a laterally-extending direction.

As seen in FIGS. 8A through 12, fixed fences 48 and 50 of fence-supporting member 42 preferably include a slot 52 defined by a first or front internal wall 54 spaced away from a second or rear internal wall 56, in order to form a space therebetween extending laterally along both fixed fences 48 and 50 on opposite sides of saw blade 16. Each movable fence 32 and 34 preferably includes an upper portion 58, an optional spring biased gap-filing flap 60, and a tongue portion 62 slidingly received within a respective slot 52, with the lower face 107 of each upper portion 58 slidingly engaging fence-supporting member 42. The front external faces 63 of fence-supporting member 42 and front faces 67 of each movable fence 32 and 34, respectively, are vertically aligned and flush with one another as illustrated in FIG. 8A.

Figure 9:
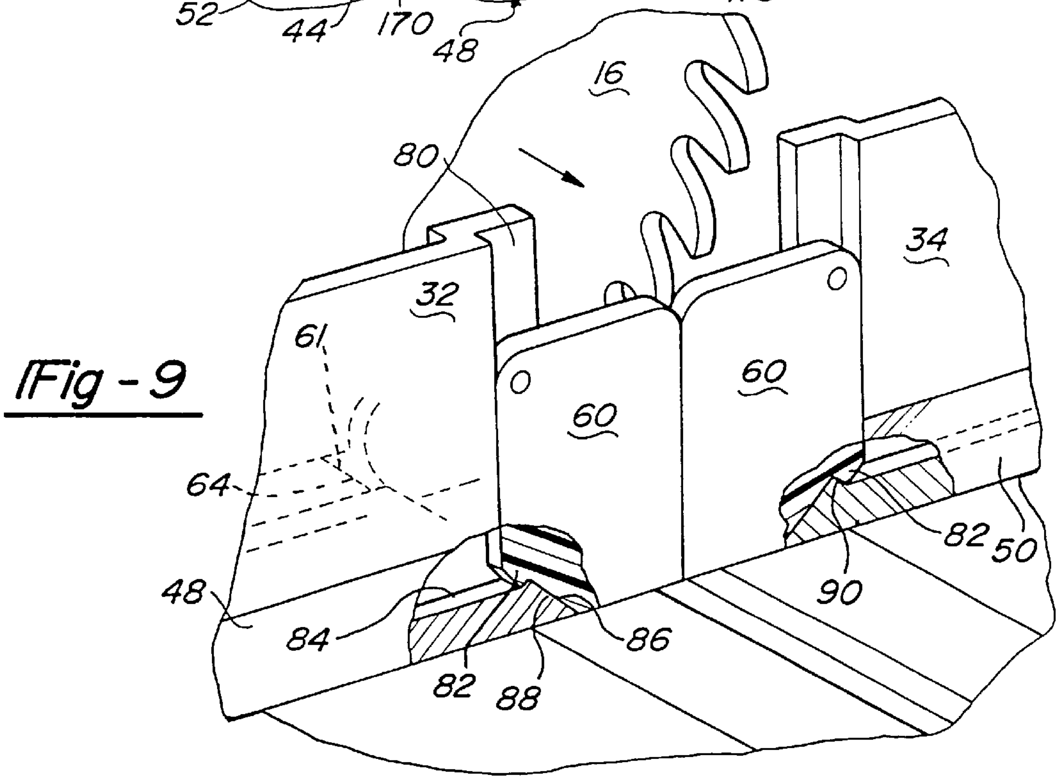
FIG. 9 is a schematic front perspective view of the adjustable fence assembly shown prior to the saw blade or cutter providing the minimum allowable clearance between the two gap-filling flaps.
Figure 10:
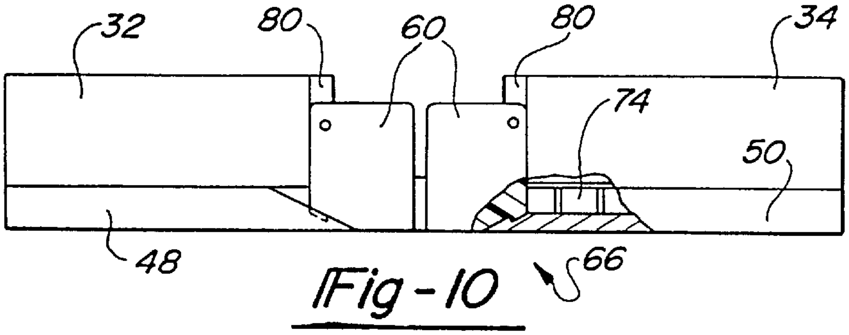
FIG. 10 is a front elevational view, partially in cross section, of one of the fence guides of the adjustable fence assembly illustrating the fixed fence pad according to the present invention.

Prior to performing a cutting operation on workpiece 24, the minimum clearance between gap-filling flaps 60 must first be set. This procedure begins, as shown in FIG. 9, with each movable fence 32 and 34 being secured at its innermost position with a stop 61 on each movable fence 32 and 34 engaging a stop 64 located on each fixed fence 48 and 50 (see also FIG. 5). In this position, both gap-filling flaps 60 are biased by a spring (not shown) to their lowered position eliminating the gap between movable fences 32 and 34. Miter saw 10 is placed in its straight sliding position and saw blade 16 is moved to cut through gap-filling flaps 60, which are manufactured from easily cutable material, such as ABS, nylon or any other rigid plastic to provide the minimum clearance for movable fences 32 and 34. Flaps 60 could also be made form a non-ferous material such as aluminum if clearance for saw blade 20 is provided in the initial design of these flaps.

Figure 8B:
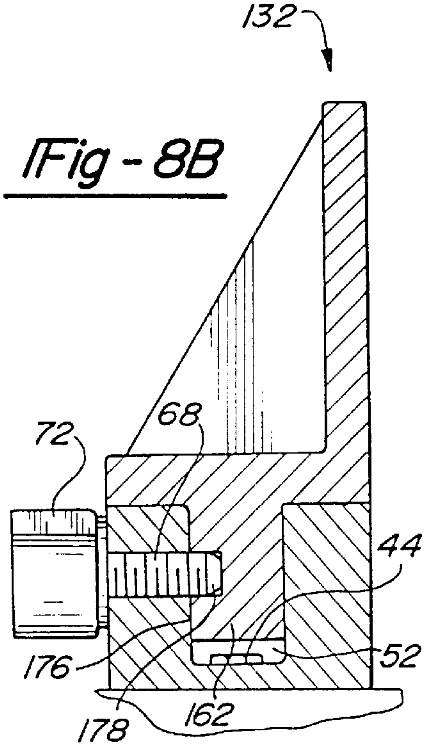
FIG. 8B is a view similar to 8*a* but showing an anti-removal system according to another embodiment of the present invention.
Figure 11:
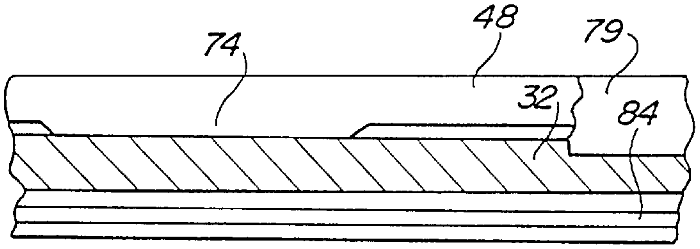
FIG. 11 is an enlarged plan view, partially in cross-section, of the engagement between the fixed fence pad and the movable fence according to the present invention.
Figure 12:
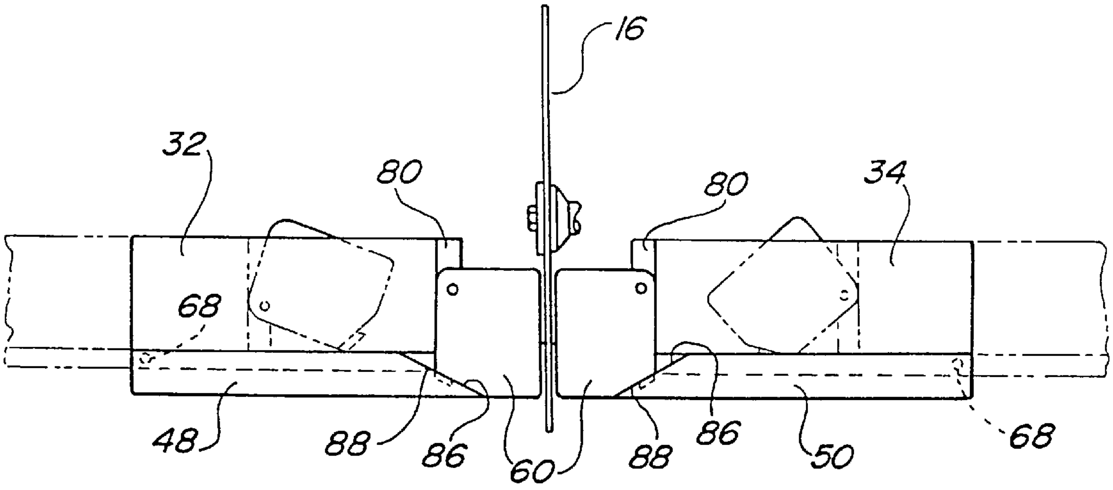
FIG. 12 is a schematic diagram, looking from the rear of the saw, depicting the fully retracted and partially extended positions of the movable fences.

In order to selectively secure each movable fence 32 and 34 in a preselected, adjusted position for purposes of performing a desired cutting operation, a single fixed clamping arrangement 66 is preferably provided for releasably fixing the position of each movable fence 32 and 34 relative to its respective fixed fence 48 or 50, with their front faces 67, 63, respectively, being flush and vertically aligned. Single fixed clamping mechanism 66 will be described in relation to movable fence 32 and fixed fence 48. It is to be understood that an identical clamping mechanism 66 can be associated with movable fence 34 and fixed fence 50 of the present invention. Single fixed clamping mechanism 66 preferably includes a clamping screw 68 threadably engaging and movable within a threaded opening 70 in fixed fence 48. Clamping screw 68 is selectively rotatable by way of a manual knob 72 in order to threadably advance clamping screw 68 toward tongue portion 62 and to clampingly and forcibly urge tongue portion 62 against front internal wall 54 of slot 52 as shown in FIG. 8A. Single fixed clamping mechanism 66 properly positions movable fence 32 due to the incorporation of an integrally machined pad 74 located on fixed fence 48 and a corresponding integrally machined surface 76 located on movable fence 32 as best illustrated in FIGS. 5, 8A, 10 and 11. Machined pad 74 is located on the innermost end of fixed fence 48 within slot 52 and in the preferred embodiment extends a distance of approximately 1.20 inches. Machined surface 76 extends along the entire inside length of movable fence 32, although it is within the scope of the present invention to provide a smaller machined surface 76 which would be located on the inside end of movable fence 32. This smaller machined surface 76 would be similar to and designed to mate with machined pad 74. Thus, when movable fence 32 is moved to its innermost position, as shown in solid lines of FIG. 12, machined pad 74 engages machined surface 76, as shown in FIG. 11, in order to insure that the front face 67 of movable fence 32 is vertically aligned and flush with the front external face 63 of fixed fence 48. Machined pad 74 and machined surface 76 are machined to a tight tolerance in order to reduce the amount of clearance between the pad 74 and surface 76 to approximately 0.006 inches ±0.002 inches when they are engaged. Thus, the clearance between tongue portion 62 of movable fence 32 and slot 52 of fixed fence 48 is reduced to approximately 0.006 inches which eliminates the need to incorporate a clamping member in the area adjacent the innermost portion of movable fence 32. The small clearance between machined pad 74 and machined surface 76 prohibits the rearward movement of movable fence 32 thus keeping faces 63 and 67 flush and vertically aligned. As shown in FIGS. 8A and 8B, movable fence 32 is clamped in position by rotating knob 72 which threadably advances clamping screw 68 toward tongue portion 62 to clampingly and forcibly urge tongue portion 62 against front internal wall 54 of slot 52. The opposite end of movable fence 32 is held in position by the engagement of machined pad 74 and machined surface 76 as detailed above.

The engagement between machined pad 74 of fixed fence 48 and machined surface 76 of movable fence 32 will continue as movable fence 32 is moved outwards until the proximate center of movable fence 32 generally aligns with the center line of clamping screw 68. At this point in the adjustment of movable fence 32 and throughout the remainder of the outward adjustment of movable fence 32, the single fixed clamping mechanism incorporating clamping screw 68 provides sufficient clamping without the engagement of pad 74 and surface 76 due to the now centralized location of clamping screw 68 to position movable fence 32 flush and vertically aligned with fixed fence 48 as illustrated in FIG. 8A.

In order to minimize the possibility of inadvertent removal of movable fence 32 from fixed fence 48 during position adjustments, machined surface 76 of tongue portion 62 is preferably provided with an elongated anti-removal groove or slot 78 extending laterally therealong, as shown in FIGS. 5 and 8A. Anti-removal slot 78 in movable fence 32 is aligned with a clamping plate 79 which is fixedly secured to fixed fence 48 by a plurality of bolts 81. Clamping plate 79 extends into slot 78 to prevent vertical removal of movable fence 32. Removal of movable fence 32 can be accomplished by the lateral movement of movable fence 32 until the movable fence is totally removed. Clamping plate 79 also resists the upward movement of movable fence 32 due to the reaction of spring loaded gap-filling flap 60.

Thus, when adjustment of movable fence 32 is required, clamping screw 68 is loosened to the point of releasing the clamping load on movable fence 32. This allows for the lateral adjustment of movable fence 32 without inadvertent removal of movable fence 32 from slot 52. When it is desired to remove movable fence 32 for repair, replacement or cleaning, however, clamping screw 68 (see FIG. 8A) is loosened allowing removal of movable fence 32 by moving movable fence 32 laterally to disengage clamping plate 79 from slot 78.

As indicated above, movable fence 34 and fixed fence 50 also incorporate single fixed clamping arrangement 66 in order to secure movable fence 34 to fixed fence 50 on the opposite side of saw blade 16.

Also as noted above, each movable fence 32 and 34 is provided with a respective spring biased gap-filling flap 60. The location and function of gap-filling flap 60 will be described in relation to movable fence 32 and fixed fence 48. It is to be understood that an identical gap-filling flap 60 is associated with movable fence 34 and fixed fence 50 on the opposite side of saw blade 16 in the present invention. Flap 60 is pivotably mounted at 81 to movable fence 32 within a recess 80 provided at the inner end of movable fence 32. Gap-filling flap 60 is biased to its lower position, as shown in FIG. 5 in solid lines, by a spring (not shown). As described above in reference to FIG. 9, when gap-filling flap 60 is located in its lowered position, the minimum gap between movable fence 32 and saw blade 16 is initially provided. As shown in FIGS. 8A and 9, flap 60 is provided with a tab 82 which rides in a slot 84 longitudinally extending along fixed fence 48 generally parallel to slot 52. The width of flap 60, the depth of recess 80, the location and thickness of tab 82 and the thickness and width of slot 84 are selected to position the outer surface of flap 60 in a vertically aligned generally flush location with faces 63 of fixed fence 48 and faces 67 of movable fence 32. Flap 60 can be moved from its lowered position, as shown in FIG. 9, due to the engagement of a ramped or angular surface 86 located on fixed fence 48 with a corresponding angular surface 88 located on flap 60. As movable fence 32 is moved laterally from its innermost position toward its outermost position, surfaces 86 and 88 react to pivot flap 60 upwardly, as shown in phantom in FIG. 12.

When movable fences 32 and 34 are located in their innermost positions, as shown in FIG. 9, movable flaps 60 are restricted from pivoting due to the engagement of tabs 82 with blind ends 90 of slots 84. The movement of movable fences 32 and 34 laterally towards their outermost positions disengages tabs 82 from their respective blind end 90 allowing for the pivoting of gap-filling flaps 60.

As indicated above, movable fence 34 also incorporates a respective gap-filling flap 60 in order to minimize the gap between movable fence 34 and saw blade 16. The above description applies equally well to movable fence 34 and fixed fence 50.

Figure 13:
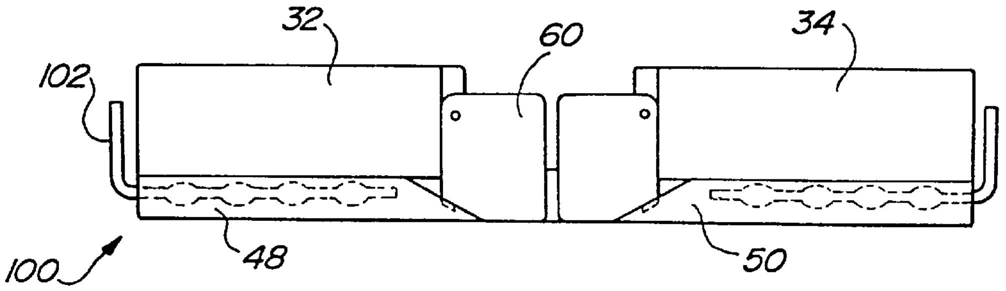
FIG. 13 is a schematic diagram similar to FIG. 7 illustrating a single locking mechanism according to another embodiment of the present invention.
Figure 14:
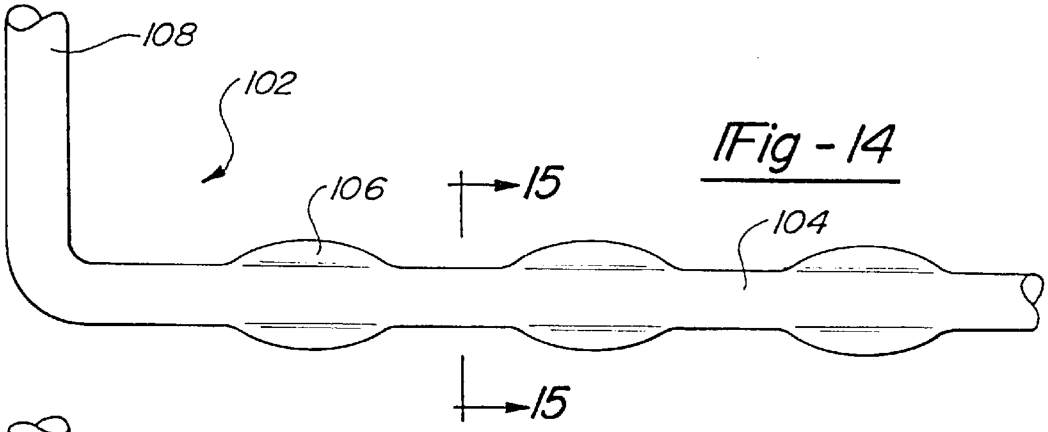
FIG. 14 is a front elevational view of the cam locking bar shown in FIG. 13.
Figure 15:
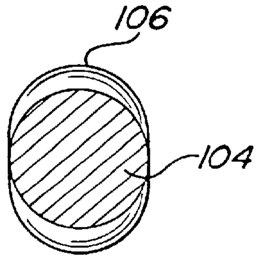
FIG. 15 is a cross-sectional view illustrating the shape of the cam locking bar shown in FIGS. 13 and 14.

FIGS. 13 through 16 illustrate another embodiment of a single fixed clamping arrangement 100 for releasably fixing the position of each movable fence 32 and 34 relative to its respective fixed fence 48 and 50, with their respective front faces 67 and 63 flush and vertically aligned. Single fixed clamping mechanism 100 will be described in relation to movable fence 32 and fixed fence 48. It is to be understood that an identical fixed clamping mechanism 100 may be associated with movable fence 34 and fixed fence 50 of the present invention. Single fixed clamping arrangement 100 preferably includes a locking cam rod 102 rotatably connected to fixed fence 48 as shown in FIG. 13. Locking cam rod 102, as shown in FIGS. 14 and 15, includes a longitudinally extending shaft 104 having a plurality of cam lobes 106 disposed along its length. The end of shaft 104 which extends beyond the outside of fixed fence 48 is bent at an approximately 90° angle to provide an actuation handle 108 for mechanism 100. Cam rod 102 is disposed between rear internal wall 56 of slot 52 and tongue portion 62 of movable fence 32 as shown in FIG. 16. When cam lobes 106 are located in a generally vertical position, movable fence 32 may slide relative to fixed fence 48 because there is no engagement with cam rod 102. When cam rod 102 is rotated approximately 90°, cam lobes 106 move from a vertical position to a horizontal position. During this movement from a vertical position to the horizontal position, cam lobes 106 cammingly engage an angular surface or ramp 110 located on tongue portion 62 to clamp the lower face 107 of upper portion 58 of movable fence 32 against fence-supporting member 42 and the front face 109 of tongue portion 62 against front internal wall 54 of fixed fence 48 thus securing movable fence 32. The height of cam lobes 106 is selected to be greater than the gap between tongue portion 62 and fixed fence 48, thus producing the required clamping load. The number of cam lobes 106 which engage movable fence 32 will depend upon the relative lateral positioning of movable fence 32 along fixed fence 48.

As indicated above, movable fence 34 and fixed fence 50 can also incorporate single fixed clamping arrangement 100 in order to secure movable fence 34 to fixed fence 50 on the opposite side of saw blade 16. The above description applies equally well to movable fence 34 and fixed fence 50.

Figure 17:
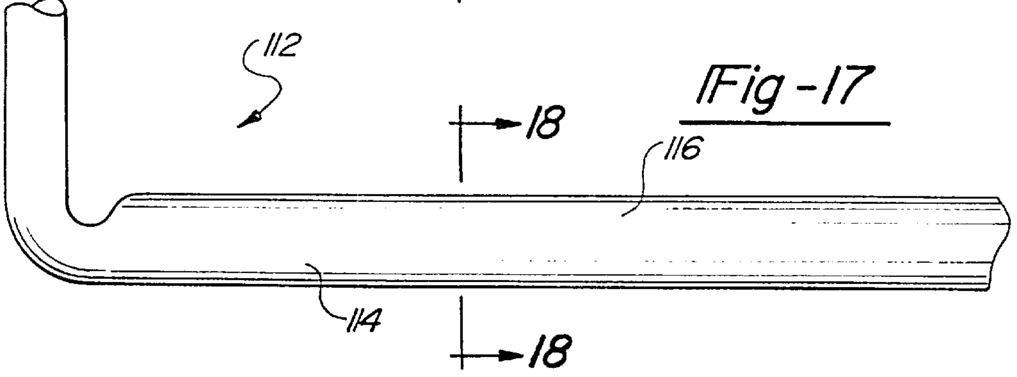
FIG. 17 is a front elevational view of a cam locking bar according to another embodiment of the present invention.
Figure 18:
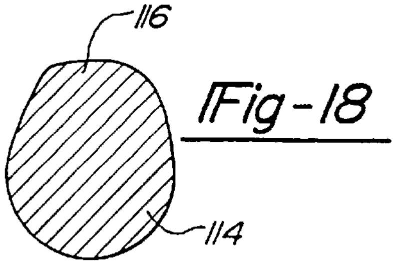
FIG. 18 is a cross-sectional view illustrating the shape of the cam locking bar shown in FIG. 16.

FIGS. 17 and 18 illustrate another preferred embodiment for a locking cam rod 112. Locking cam rod 112 is rotatably secured to each fixed fence 48 and 50 in a similar manner to locking cam rod 102. The difference between locking cam rod 112 and locking cam rod 102 is that locking cam rod 112 includes a longitudinally extending shaft 114 having a continuously extending cam lobe 116 disposed along its entire length. The remainder of locking cam rod 112 and the operation of locking cam rod 112 is the same as that described above for locking cam rod 102. The length of cam lobe 116 which engages movable fences 32 and 34 will depend upon the lateral positioning of movable fences 32 and 34 along their respective fixed fences 48 and 50.

Figure 19:
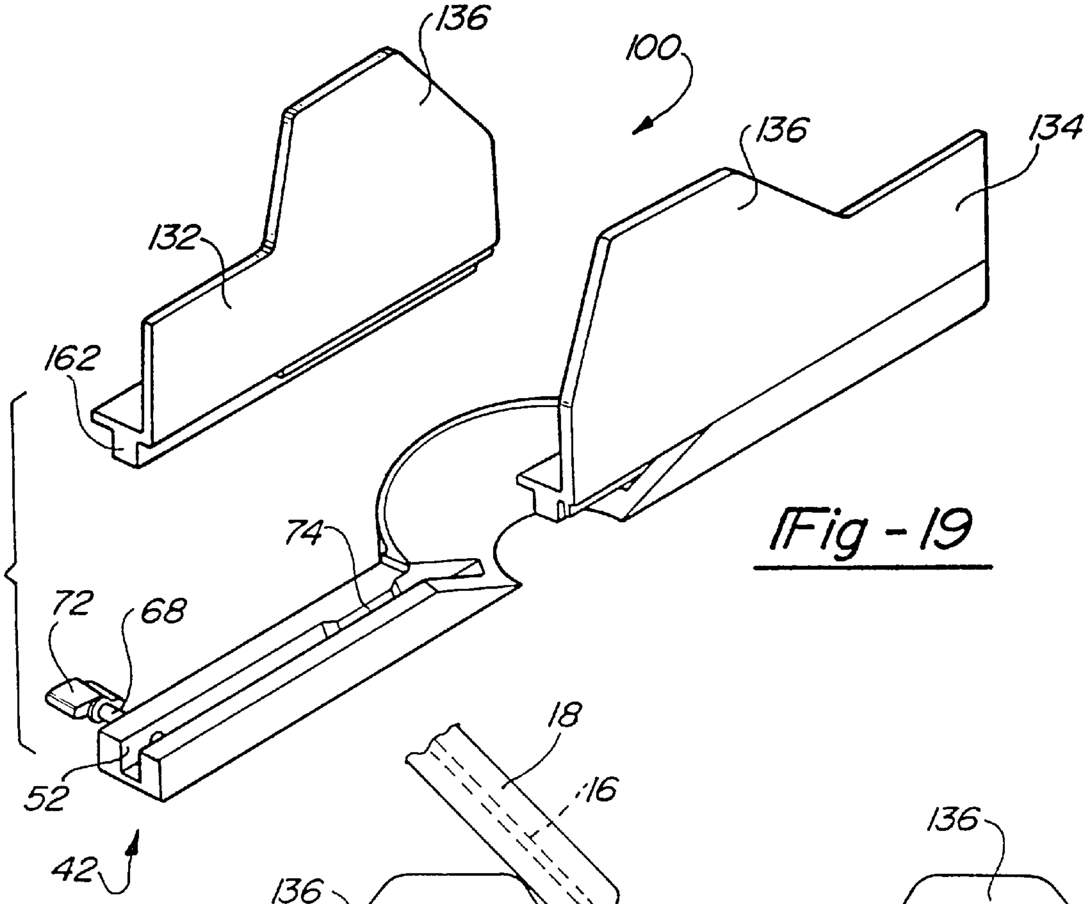
FIG. 19 is a schematic front perspective view similar to FIG. 5 of the adjustable fence according to another embodiment of the present invention.

FIG. 19 illustrates a fence assembly 130 according to another embodiment of the present invention. Fence assembly 130 is similar to fence assembly 30 but it does not include pivotable flaps 60. In place of flaps 60, fence assembly 130 includes a pair of movable fences 132 and 134 incorporating a raised portion 136. Here, a raised portion 136 is formed generally at the saw blade end of movable fences 132 and 134, with the edge of each raised portion 136 sloping generally downward toward saw blade 16 and table assembly 14. Such raised portions 136 are sized and configured, as is schematically illustrated in FIG. 20, so that it interferingly engages blade guard 18 if blade guard 18 and saw blade 16 are moved from their rear clear positions to their cutting position when in substantially all of the cutting set-up modes or configurations of which sliding compound miter saw 10 is capable.

In addition, as can be seen in FIG. 19, raised portions 136 of movable fences 132 and 134 provide an increased vertical workpiece supporting face or surface, which allows the operator to properly support a relatively tall or thick workpiece. Such increased-height workpiece-supporting capability is especially advantageous when cutting thick stock, crown moldings, base boards, or other such relatively tall workpiece shapes, orientations or configurations. Single fixed clamping arrangement 66 or single fixed clamping arrangement 100 can be utilized with movable fences 132 and 134 in a similar manner as that described above for movable fences 32 and 34 in order to laterally secure movable fences 132 and 134 in their selected positions.

Figure 20:
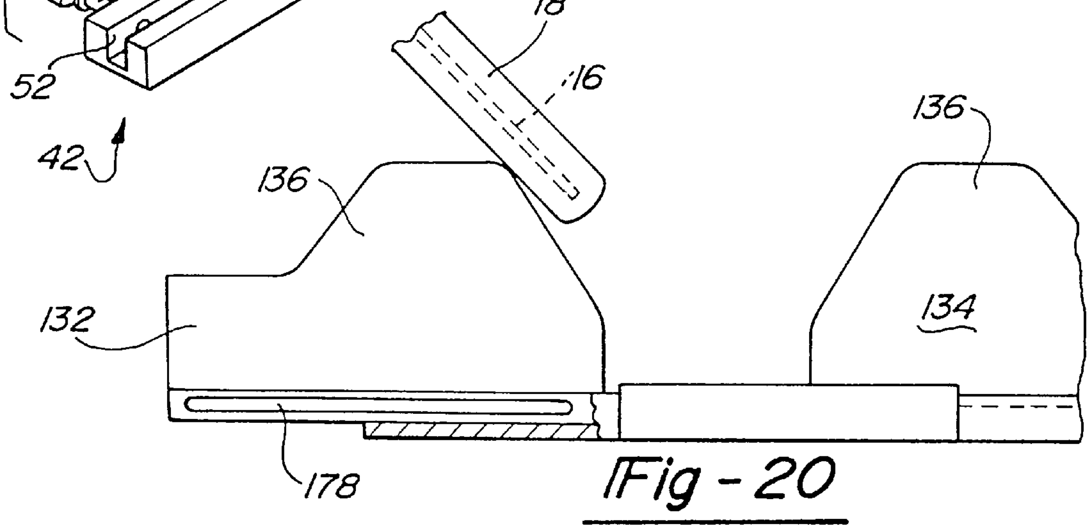
FIG. 20 is a schematic illustration of an interfering relationship of the saw blade guard with the movable fence of the work-supporting fence assembly for alerting the operator that the movable fence of the fence assembly has not been properly adjusted for the operation being performed.
Figure 21A:
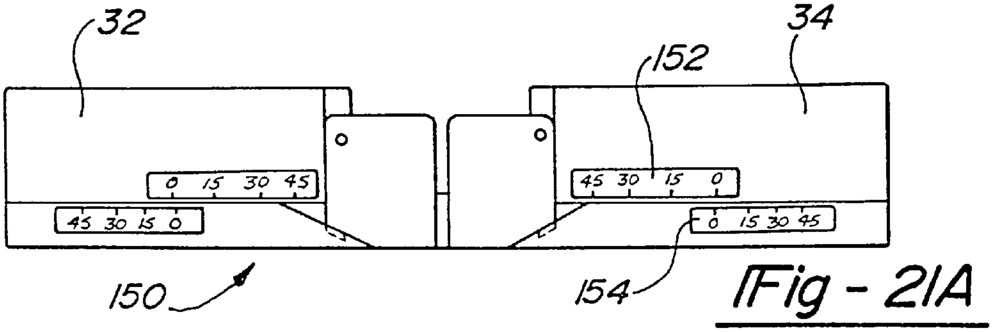
FIG. 21A is a front elevational view of an adjustable fence assembly incorporating a fence position indicator in accordance with the present invention.

In order to minimize the possibility of inadvertent removal of movable fence 132 from fixed fence 48 or movable fence 134 from fixed fence 50 during position adjustments, the rear face 176 of tongue portion 162 is preferably provided with an elongated anti-removal groove or slot 178 extending laterally therealong, as shown in FIGS. 8B and 20. Anti-removal slot 178 in movable fence 132 is aligned with clamping screw 68 such that clamping screw 68 extends into slot 178 prior to exerting any clamping load on movable fence 132.

Thus, when adjustment of movable fence 132 is required, clamping screw 68 is loosened to the point of releasing the clamping load on movable fence 132 but still in engagement with slot 178. This allows for the lateral adjustment of movable fence 132 without inadvertent removal of movable fence 132 from slot 52. As seen in FIG. 20, the lateral length of slot 178 is sufficient to allow full adjustment of movable fence 132 but insufficient to allow inadvertent lateral removal of movable fence 132. When it is desired to remove movable fence 132 for repair, replacement or cleaning, however, clamping screw 68 (see FIGS. 8B and 19) is loosened allowing removal of movable fence 132. As indicated above, movable fence 134 and fixed fence 50 also incorporate anti-removal slot 178 for engagement with clamping screw 68.

FIGS. 21A through 21D schematically illustrate a fence position indicator 150 associated with fence assembly 30, although it is within the scope of the present invention to incorporate fence position indicator 150 into fence assembly 130 or any other type of movable fence assembly.

Fence position indicator 150 includes an upper indicator 152 secured to movable fences 32 and 34 and a lower indicator 154 secured to fixed fences 48 and 50. Upper fence indicator 152 has positions marked to indicate the degree of bevel angle to which sliding compound miter saw 10 is to be or has been adjusted. Lower fence indicator 154 has positions marked to indicate the degree of miter angle to which miter saw 10 is to be or has been adjusted. Thus, by aligning the proper beveling mark on upper fence indicator 152 with the proper mitering mark on lower fence indicator 154, the proper fence position for movable fences 32 and 34 will be achieved. Fence position indicator 150 can also be incorporated with movable fences 132 and 134 if desired.

For example, for making solely a bevel cut of 30°, as shown in FIG. 21B, the 30° mark on upper indicator 152 is aligned with the 0° mark on lower indicator 154. For making solely a miter cut of 45°, as shown in FIG. 21C, the 45° mark on lower indicator 154 is aligned with the 0° mark on upper indicator 152. For a compound cutting operation for a bevel cut of 30° in combination with a miter cut of 45°, as shown in FIG. 21D, the 30° mark on upper indicator 152 is aligned with the 45° on lower indicator 154.

It may be advantageous to include a mechanism for releasably holding movable fences 32 and 34 when movable fences 32 and 34 are located in one or more of the most popular beveling and/or mitering positions. This can be accomplished by providing movable fences 32 and 34 with one or more indentations 170 extending along the front face of tongue 62, as shown in FIG. 5. Then by incorporating a spring loaded check ball assembly 172, as shown in FIG. 8A, positioned in fixed fences 48 and 50 at the proper locations, movable fences 32 and 34 will be releasably held at the various positions of movable fences 32 and 34.

While the present invention has been described for exemplary purposes as being incorporated into sliding compound miter saw 10, it is within the scope of the present invention to incorporate the movable fence assemblies of the present invention into compound miter saws, chop saws, radial arm saws, table saws, dado saws, spindle shapers, sanders or other types of powered or unpowered devices that could benefit from the selective adjustment of the distance between the fence and the working tool.

While the above detailed description describes the preferred embodiment of the present invention, it should be understood that the present invention is susceptible to modification, variation and alteration without deviating from the scope and fair meaning of the subjoined claims.

What is claimed is:

1. A device for performing working operations on a workpiece, said device comprising:

a motor;

a base supporting said motor, said base defining a first planar workpiece supporting surface;

a working tool drivingly connected to said motor;

a first fence attached to said base, said first fence defining a second planar workpiece supporting surface, said second planar workpiece supporting surface being generally perpendicular to said first planar workpiece supporting surface;

a first flap pivotably secured to said first fence, said first flap pivoting about an axis generally perpendicular to said second planar workpiece supporting surface, said first flap defining a third planar workpiece supporting surface, said third planar workpiece supporting surface being generally coplanar with said second planar workpiece supporting surface.

2. The device according to claim 1 wherein, said first fence comprises a first fixed fence attached to said base and a first movable fence attached to said first fixed fence, said first flap being pivotably secured to said first movable fence.

3. The device according to claim 2, further comprising anti-removal means for inhibiting removal of said first movable fence from said first fixed fence.

4. The device according to claim 3, wherein said anti-removal means includes a clamping screw threadably engaging said first fixed fence, said clamping screw being threadably movable into and out of abutting engagement with said first movable fence.

5. The device according to claim 3, wherein said anti-removal means includes a plate secured to said first fixed fence, said plate engaging a slot formed in said first movable fence.

6. The device according to claim 2, further comprising means for indicating a relative position of said first movable fence in relation to said first fixed fence.

7. The device according to claim 6, wherein said means for indicating includes a first indicator located on one of said first fixed fence and said first movable fence.

8. The device according to claim 7, wherein said means for indicating includes a second indicator located on the other of said first fixed fence and said first movable fence, said second indicator and said first indicator locating the position of said first movable fence with respect to said first fixed fence for a predetermined bevel angle and a predetermined miter angle.

9. The device according to claim 2, further comprising a member for releasably holding said first movable fence in a predetermined position in relation to said first fixed fence.

10. The device according to claim 1 further comprising:

a second fence attached to said base, said second fence defining a fourth planar workpiece supporting surface, said first fence being disposed on one side of said working tool, said second fence being disposed on an opposite side of said working tool; and a second flap pivotably secured to said second fence, said second flap pivoting about an axis generally perpendicular to said fourth planar workpiece supporting surface.

11. The device according to claim 10 wherein, said first fence comprises a first fixed fence attached to said base and a first movable fence attached to said first fixed fence, said first flap being pivotably secured to said first movable fence and wherein said second fence comprises a second fixed fence attached to said base and a second movable fence attached to said second fixed fence, said second flap being pivotably secured to said second movable fence.

12. The device according to claim 11, further comprising first anti-removal means for inhibiting removal of said first movable fence from said first fixed fence and second anti-removal means for inhibiting removal of said second removable fence from said second fixed fence.

13. The device according to claim 12, wherein said first anti-removal means includes a first clamping screw threadably engaging said first fixed fence and said second anti-removal means includes a second clamping screw threadably engaging said second fixed fence.

14. The device according to claim 12, wherein said first anti-removal means includes a first plate secured to said first fixed fence and said second anti-removal means includes a second plate secured to said second fixed fence, said first plate engaging a slot in said first movable fence, said second plate engaging a slot in said second movable fence.

15. The device according to claim 11, further comprising means for indicating a relative position of said first movable fence in relation to said first fixed fence and means for indicating a relative position of said second movable fence in relation to said second fixed fence.

16. The device according to claim 15, wherein said means for indicating a relative position of said first movable fence includes a first indicator located on one of said first fixed fence and said first movable fence and said means for indicating a relative position of said second movable fence includes a second indicator located on one of said second fixed fence and said second movable fence.

17. The device according to claim 16, wherein said means for indicating a relative position of said first movable fence includes a third indicator located on the other of said firs fixed fence and said first movable fence, said third indicator and said first indicator locating the position of said first movable fence with respect to said first fixed fence for a first predetermined bevel angle and a first predetermined miter angle and said means for indicating a relative position of said second movable fence includes a fourth indicator located on the other of said second fixed fence and said second movable fence, said fourth indicator and said second indicator locating the position of said second movable fence with respect to said second fixed fence for a second predetermined bevel angle and a second predetermined miter angle.

18. The device according to claim 11, further comprising a first member for releasably holding said first movable fence in a predetermined position in relation to said first fixed fence and a second member for releasably holding said second movable fence in a predetermined position in relation to said second fixed fence.

19. A fence system for a power tool having a first planar workpiece supporting surface, said fence system comprising:

- a first fence defining a second planar workpiece supporting surface, said second workpiece supporting surface adapted to be generally perpendicular to said first workpiece supporting surface; and
- a first flap pivotably secured to said first fence said first flap pivoting about an axis generally perpendicular to said second planar workpiece supporting surface, said first flap defining a third planar workpiece supporting surface, said third workpiece supporting surface being generally coplanar with said second planar workpiece supporting surface.

20. The fence system according to claim 19 wherein said first fence comprises a first fixed fence and a first movable fence attached to said first fixed fence, said first flap being pivotably secured to said first movable fence.

21. The fence system according to claim 20, further comprising anti-removal means for inhibiting removal of said first movable fence from said first fixed fence.

22. The fence system according to claim 21, wherein said anti-removal means includes a clamping screw threadably engaging said first fixed fence, said clamping screw being threadably movable into and out of abutting engagement with said first movable fence.

23. The fence system according to claim 21, wherein said anti-removal means includes a plate secured to said first fixed fence, said plate engaging a slot formed in said first movable fence.

24. The fence system according to claim 20, wherein said first movable fence includes a raised portion disposed at said one end of said first movable fence, said raised portion engaging said first fixed fence to align a front face of said first fixed fence and a front face of said first movable fence.

25. The fence system according to claim 20, further comprising means for indicating a relative position of said first movable fence in relation to said first fixed fence.

26. The fence system according to claim 25, wherein said means for indicating includes a first indicator located on one of said first fixed fence and said first movable fence.

27. The fence system according to claim 26, wherein said means for indicating includes a second indicator located on the other of said first fixed fence and said first movable fence.

28. The fence system according to claim 20, further comprising a member for releasably holding said first movable fence in a predetermined position in relation to said first fixed fence.

29. The fence system according to claim 19 further comprising:

- a second fence defining a third planar workpiece supporting surface, said third planar workpiece supporting surface adapted to be generally perpendicular to said first planar workpiece supporting surface; and
- a second flap pivotably secured to said second fence, said second flap pivoting about an axis generally perpendicular to said third planar workpiece supporting surface.

30. The fence system according to claim 29 wherein said first fence comprises a first fixed fence and a first movable fence attached to said first fixed fence, said first flap being pivotably secured to said first movable fence and wherein said second fence comprises a second fixed fence and a second movable fence attached to said second fixed fence, said second flap being pivotably secured to said second movable fence.

31. The fence system according to claim 30, further comprising first anti-removal means for inhibiting removal of said first movable fence from said first fixed fence and second anti-removal means for inhibiting removal of said second removable fence from said second fixed fence.

32. The fence system according to claim 31, wherein said first anti-removal means includes a first clamping screw threadably engaging said first fixed fence and said second anti-removal means includes a second clamping screw threadably engaging said second fixed fence.

33. The fence system according to claim 31, wherein said first anti-removal means includes a first plate secured to said first fixed fence and said second anti-removal means includes a second plate secured to said second fixed fence, said first plate engaging a slot in said first movable fence, said second plate engaging a slot in said second movable fence.

34. The fence system according to claim 30, wherein said first movable fence includes a first raised portion disposed at said one end of said first movable fence and said second movable fence includes a second raised portion disposed at said one end of said second movable fence, said first raised portion engaging said first fixed fence to align a front face of said first fence and a front fence of said first movable fence, said second raised portion engaging said second fixed fence to align a front face of said second fixed fence and a front face of said second movable fence.

35. The fence system according to claim 30, further comprising means for indicating a relative position of said first movable fence in relation to said first fixed fence and means for indicating a relative position of said second movable fence in relation to said second fixed fence.

36. The fence system according to claim 35, wherein said means for indicating a relative position of said first movable fence includes a first indicator located on one of said first fixed fence and said first movable fence and said means for indicating a relative position of said second movable fence includes a second indicator located on one of said second fixed fence and said second movable fence.

37. The fence system according to claim 36, wherein said means for indicating a relative position of said first movable fence includes a third indicator located on the other of said first fixed fence and said first movable fence, said third indicator and said first indicator locating the position of said first movable fence with respect to said first fixed fence for a first predetermined bevel angle and a first predetermined miter angle and said means for indicating a relative position of said second movable fence includes a fourth indicator located on the other of said second fixed fence and said second movable fence, said fourth indicator and said second indicator locating the position of said second movable fence with respect to said second fixed fence for a second predetermined bevel angle and a second predetermined miter angle.

38. The fence system according to claim 30, further comprising a first member for releasably holding said first movable fence in a predetermined position in relation to said first fixed fence and a second member for releasably holding said second movable fence in a predetermined position in relation to said second fixed fence.

* * * * *